United States Patent [19]

Bannai

[11] Patent Number: 5,238,383
[45] Date of Patent: Aug. 24, 1993

[54] MOLD OPENING CONTROLLER FOR AN INJECTION MOLDING MACHINE

[75] Inventor: Saburo Bannai, Shizuoka, Japan

[73] Assignee: Toshiba Machine Co., Ltd., Tokyo, Japan

[21] Appl. No.: 756,051

[22] Filed: Sep. 6, 1991

[30] Foreign Application Priority Data

Sep. 7, 1990 [JP] Japan .................. 2-235762

[51] Int. Cl.$^5$ ............................................ B29C 45/80
[52] U.S. Cl. .................... 425/150; 264/40.5; 425/167; 425/169; 425/451.9; 425/590
[58] Field of Search ............... 425/150, 162, 167, 169, 425/450.1, 451.9, 590; 264/40.5

[56] References Cited

U.S. PATENT DOCUMENTS

| | | | |
|---|---|---|---|
| 3,857,658 | 12/1974 | Muzsnay | 425/451.2 |
| 4,696,632 | 9/1987 | Inaba | 425/150 |
| 4,855,095 | 8/1989 | Sato | 425/150 |
| 4,917,840 | 4/1990 | Harada et al. | 425/590 |

Primary Examiner—Tim Heitbrink
Attorney, Agent, or Firm—Young & Thompson

[57] ABSTRACT

A mold opening controller for injection molding machines, having a control unit for controlling the hydraulic circuit. The control unit having a setter for setting acceleration/deceleration functions of a movable portion such as the movable mold; a data input for the setter; an operational unit for calculating the acceleration/deceleration of portions of the movable mold and the acceleration/deceleration speeds at each moving position at the time of the acceleration/deceleration on the bases of data from the setter and the data input; a position sensor for detecting the moving position of the movable mold; and a control for controlling the hydraulic circuit so that acceleration/deceleration positions of the movable mold and its moving speed at each position correspond to the output values of the operational unit through the position sensor.

5 Claims, 2 Drawing Sheets

MOLD OPENING CONTROLLER FOR AN INJECTION MOLDING MACHINE

FIELD OF THE INVENTION

This invention relates to a mold opening controller for injection molding machines.

BACKGROUND OF THE INVENTION

Automatic control of a mold opening/closing speed through a program has been known in a mold opening controller using a hydraulic circuit in injection molding machines so as to improve an operation efficiency.

Such an apparatus generally controls a flow rate regulating valve disposed in a hydraulic circuit by the use of a limit switch and a timer, or has the flow rate regulating valve comprising a specific servo valve, as is known in the art. However, such an apparatus involves the problem of low controllability in the case of the former because response of the valve is poor, and the problem of a high production cost in the case of the latter because the servo valve is expensive.

Therefore, the applicant of this invention developed a mold opening controller which has high controllability and is relatively economical, and filed an application for a patent under the Japanese Patent Publication No. 3418/1988.

The apparatus comprises a flow rate regulating valve and a pressure regulating valve that are disposed in the hydraulic circuit, and a signal generator for controlling the opening of each of the flow rate regulating valve and the pressure regulating valve through a position sensor, so that the moving speed of a movable mold at an arbitrary position may be set arbitrarily. According to this apparatus, therefore, the moving speed of the movable mold or in other words, the mold opening speed, may be set to an optimum level by disposing a predetermined number of signal generators and setting appropriately the position of each signal generator relative to the movable mold and the signal quantity at this position.

However, the apparatus described hereinbefore has yet left the following critical problems still to be improved.

First of all, in a mold opening/closing apparatus for injection molding machines the acceleration/deceleration of a movable mold, particularly the acceleration/deceleration at the time of completion of mold closing and mold opening, must be set to those values which do not apply any shock to the mold opening/closing apparatus and which are as high as possible. However, these optimum acceleration/deceleration and optimum acceleration/deceleration positions vary with the kind of mold opening/closing apparatuses and with the kind of molds used even in the same mold opening/closing apparatus. In the mold opening controller described above, however, the optimum acceleration/deceleration positions and optimum acceleration/deceleration must be reset whenever the mold is changed. This change of setting is made by the repetition of a trial-and-error system and moreover, since a relatively large number of signal generators are disposed, this operation needs a great deal of labor and a high level of skill.

Further, the mold opening controller described above may be produced relatively economically but is relatively complicated in structure because a large number of signal generators are required.

SUMMARY OF THE INVENTION

It is therefore an object of the present invention to provide a mold opening controller which may automatically accomplish setting of the mold opening/closing speeds by merely inputting required data on the replacing molds, and which is simple in structure.

To perform the foregoing purpose, there is provided a mold opening controller for injection molding machines which comprises a mold opening/closing apparatus including a stationary platen for holding a stationary mold, a movable platen for holding a movable mold, a mold clamping ram and a mold clamping cylinder for supporting retractably the movable platen, and a hydraulic circuit for driving and moving back and forth the mold clamping ram, wherein the mold opening/closing apparatus provides a control unit for controlling the hydraulic circuit, the control unit being further comprised of a setter for setting acceleration/deceleration functions of a movable portion such as the movable mold determined in accordance with the characteristics of the mold opening/closing apparatus; data input means for the setter; an operational unit for calculating the acceleration/deceleration positions of the movable mold and the acceleration/deceleration speeds at each moving position at the time of the acceleration/deceleration on the bases of data from the setter and the data input means; a position sensor for detecting the moving position of the movable mold; and control means for controlling the hydraulic circuit so that acceleration/deceleration positions of the movable mold and its moving speed at each position correspond to the output values of the operational unit through the position sensor, and the acceleration/deceleration positions of the movable mold and its moving speed at each position are set automatically to optimum values by inputting the thickness of both of the stationary and movable molds and the molding stroke of the movable mold to the data input means.

In this case, the control unit for the hydraulic circuit may be composed of an opening setter for setting the opening of a flow rate regulating value disposed in the hydraulic circuit, or an opening setter for setting the opening of a pressure regulating valve disposed further and likewise in the hydraulic circuit.

When the mold thickness and the molding stroke are inputted to the control unit through the data input means, the acceleration/deceleration positions of the movable mold and its acceleration/deceleration are calculated and set through the setter and the operational unit, so that the hydraulic circuit is controlled in a predetermined way through the control means and the optimum mold opening/closing speeds may be set automatically.

PREFERRED EMBODIMENTS OF THE INVENTION

Figure 1:
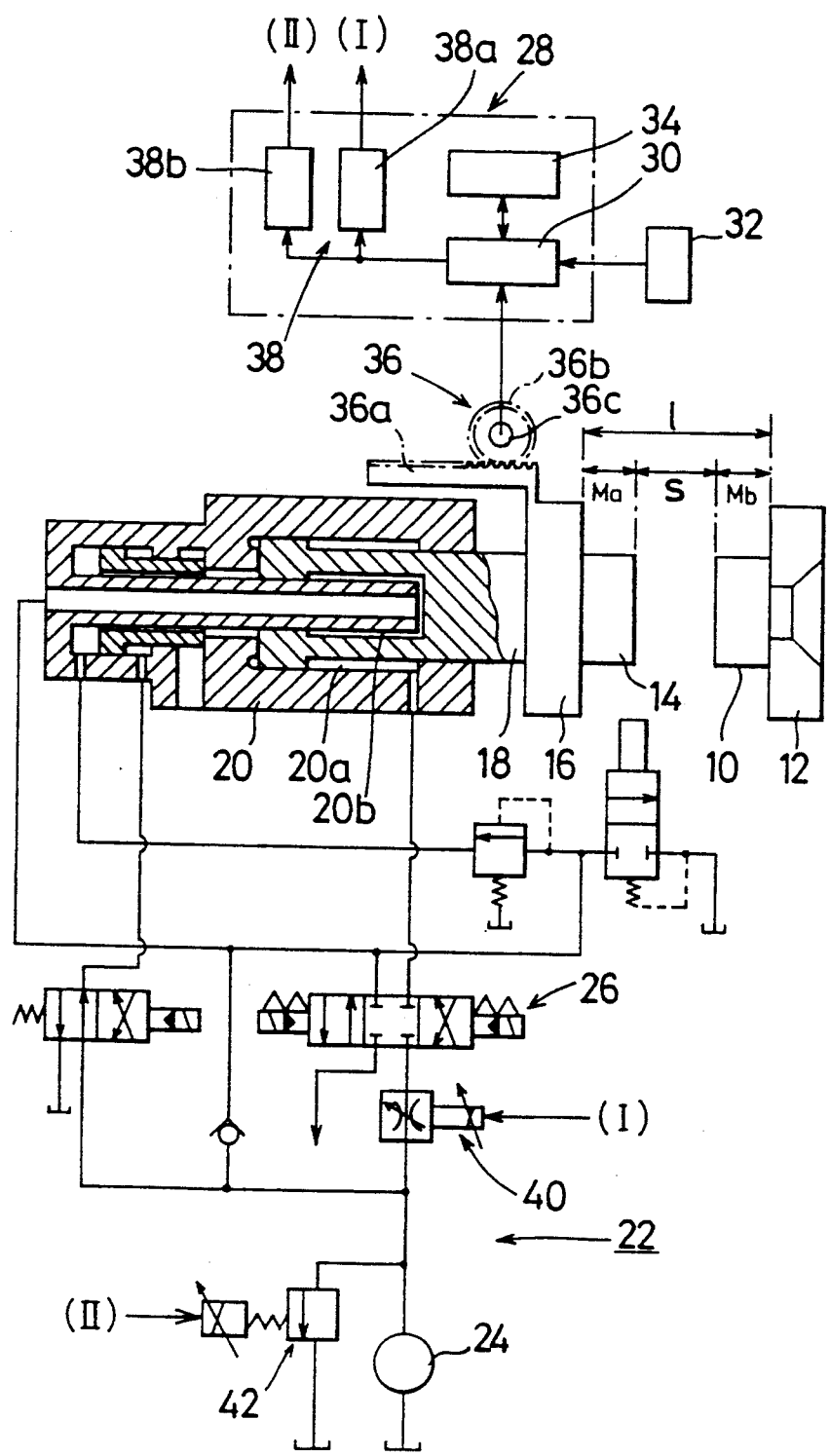
FIG. 1 is a systematic explanatory view showing an embodiment of a mold opening controller of an injection molding machine or the like in accordance with the present invention.

The mold opening controller for injection molding machines in accordance with an embodiment of the present invention will be explained in detail with reference to the accompanying drawings.

First of all, a mold opening/closing apparatus of this kind generally comprises a stationary platen 12 for holding a stationary mold 10, a movable platen 16 for holding a movable mold 14, a mold clamping ram 18 and a mold clamping cylinder 20 for supporting retractably the movable platen 16 and a hydraulic circuit 22, as shown in the drawings. Oil discharged from a hydraulic pump 24 is alternately changed over and supplied to an oil chamber 20a or 20b through a charge-over valve 26, so that the movable platen 16 moves back and forth through the mold clamping ram 18 and the movable mold 14 is opened and closed relative to the stationary mold 10. The state shown in the drawing represents the state at the time of completion of mold opening. Symbols Ma and Mb represent the thickness of the stationary and movable molds 10 and 14, respectively, symbol S represents a molding stroke and symbol l represents the backward limit distance of the movable mold 14 relative to the stationary mold 10. Usually, the thickness Ma, Mb of both molds are the same. Hereinafter, this thickness will be sometimes represented merely by symbol M. The molding stroke S is generally set to the same value as the mold thickness M. Accordingly, the backward limit distance l is given by $2M+S=3M$ or $3S$.

However, the mold opening controller in accordance with the present invention is furnished with a control unit 28 for controlling the hydraulic circuit 22. This control unit 28 comprises a setter 30 for setting acceleration/deceleration functions (which will be later described) of the movable mold 14 and the like that are determined by the characteristics of the mold opening/closing apparatus, data input means 32 for this setter, an operational unit 34 for calculating the acceleration/deceleration positions of the movable mold 14 and the acceleration/deceleration at each moving position at that time of acceleration and deceleration of the bases of the data from the setter 30 and from the data input means 32, a position sensor 36 for detecting the moving position, and a control means 38 for controlling the acceleration/deceleration position of the movable mold 14 and the moving speed at each of the positions. The position sensor 36 in this embodiment comprises a potentiometer 36c which is engaged with a rack 36a disposed on the movable platen 16 through a pinion 36b. The controller 38 comprises two opening setters 38a and 38b, each of which is connected to a flow rate regulating valve 40 and a pressure regulating valve 42 disposed in the hydraulic circuit 22, and may be regulated so that the openings of these valves may be set to a predetermined state. Incidentally, one of the opening setter 38b and the pressure regulating valve 42 may be omitted, but control performance may be improved advantageously if both of the opening setters 38a, 38b are used as in the present embodiment.

Figure 2:
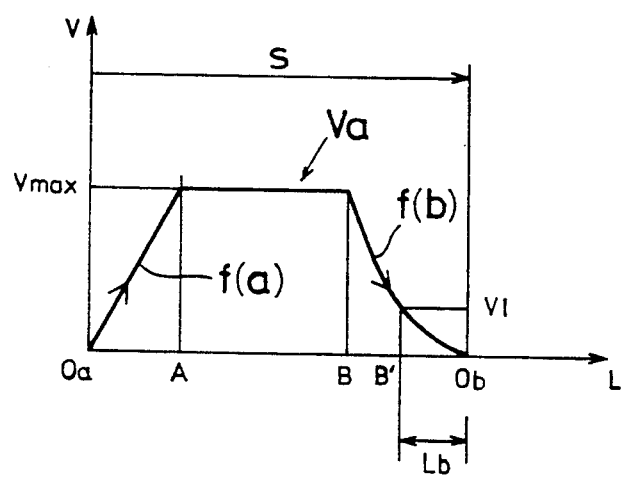
FIGS. 2(a) and 2(b) are diagrams showing the mold opening/closing speed patterns.
Figure 2:
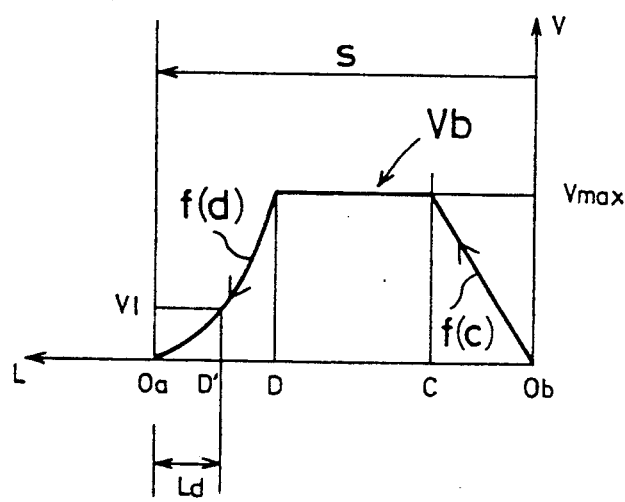

Now, the acceleration/deceleration functions of the movable portion described above will be explained, but the operation pattern of the movable portion at the time of the mold opening/closing operation will be first explained. FIG. 2(a) shows the mold closing speed pattern Va of the movable mold 14 during the mold closing stroke S from the mold opening completion point Oa to the mold closing completion point Ob, and FIG. 2(b) shows the mold opening pattern Vb during the mold opening stroke S. As can be seen from these diagrams, the speed V of the movable portion comprises rising (acceleration) portions Oa−A, Ob−C, falling (deceleration) portions B−Ob, D−Oa, and uniform speed portions A−B, C−D. The speed Vmax of the uniform speed portion is generally set to the maximum capacity speed of the mold opening/closing apparatus. On the other hand, the acceleration/deceleration functions at the rising and falling portions are expressed by the functions f(a), f(c) and f(b), f(d) as shown in the diagrams, respectively. These functions are, in this case, complicated functions associated with the acceleration/deceleration force acting on the mold clamping ram 18 and with the inertia force of the movable portion. Particularly, the falling functions f(b), f(d) may be changed at each position to optimize the deceleration at each position during deceleration so that the shock of the mold opening/closing apparatus may be prevented and at the same time, the opening cycle may be set to a high speed. The rising functions f(a), f(c) are generally set to constant acceleration. In order to set the mold opening/closing speeds in this manner or in other words, to set the speed V at the acceleration/deceleration positions A, B, C, D and at each moving position, the acceleration/deceleration functions f(a), f(b), f(c) and f(d) must be satisfied. Accordingly, a great deal of labor and a high level of skill have been necessary in the conventional apparatus as already described. In the present invention, however, setting may be made very easily due to the provision of the control unit 28 as will be described below.

The structure of control unit 28 will be explained in further detail. The setter 30 sets the acceleration/deceleration functions f(a), f(b), f(c), f(d) or the speeds V at the acceleration/deceleration positions A, B, C, D and at each moving position, and the reference values that are determined in accordance with the characteristics of the mold opening apparatus are in advance set to the setter. The input means 32 inputs the mold thickness Ma+Mb and the stroke S or the backward limit distance l at the time of the exchange of the molds 10, 14. The operational unit 34 calculates and changes the setting so that the acceleration/deceleration functions f(a), f(b), f(c), f(d) on the setter 30 correspond to the mold thickness Ma+Mb and to the stroke S. Therefore, if the mold thickness Ma+Mb and the mold stroke S are in advance inputted to the control unit 28 in the mold opening controller of the present invention, the opening of each of the flow rate regulating valve 40 and the pressure regulating valve 42 is adjusted to a predetermined condition through the opening setter 38a, 38b when the moving position of the movable mold 14 detected by the position sensor 36 coincides with the acceleration/deceleration positions A, B, C, D set to the setter 30, and the speed V of the movable mold 14 is controlled in such a manner as to coincide with the mold closing speed distribution Va and the mold opening speed distribution Vb. In other words, the mold opening/closing speeds are controlled to the optimum speeds.

The mold opening controller in accordance with the present invention provides the following advantages. In the first place, as to the prevention of the shock of the mold opening/closing apparatus, the lengths of the low speed moving distances Lb, Ld of the movable portion (the length over which the moving speed is below a predetermined low speed V; see FIG. 2) are major factors. These distances Lb, Ld may be detected easily by inputting the speed Vl to the setter 30 through the input means 32. Therefore, if there is any margin in the distances, the speed pattern may be easily calculated, changed and set so as to further reduce the mold opening/closing cycle time by reducing the distances. Accordingly, even when a specific mold such as a three-plate mold is used, the optimum mold opening/closing speed pattern may be set easily. If the occurrence of the stroke must be avoided as required by the kind of molded articles or when there is any specific requirement of a user, the speed Vmax of the uniform speed portion and the low speed moving distances Lb, Ld may be set to predetermined arbitrary values by inputting necessary data through the input means 32.

Although the present invention has been described with reference to its preferred embodiment, the present invention is in no way limited hereto but may be changed or modified in design in various ways without departing from the spirit thereof. For example, the driving mechanism of the movable portion inclusive of the movable mold may be a mechanical-electric mechanism in place of the hydraulic circuit.

As described hereinbefore, the mold opening controller of the injection molding machine and the like in accordance with the present invention includes in its mold opening/closing apparatus the setter for setting the acceleration/deceleration functions of the movable mold, the data input means for this setter, the operational unit for calculating the acceleration/deceleration positions of the movable mold and the acceleration/deceleration, the position sensor for the movable mold, and the control unit comprising the control means for controlling the hydraulic circuit so as to correspond to the output value of the operational unit. Since the apparatus of the invention is constructed in such a manner as to set the mold opening/closing speed to the optimum speed by merely inputting the required data on the replacing mold, the present invention eliminates the complicated labor and the high level of skill that have been otherwise necessary conventionally to change the setting of the mold opening/closing speed as required by the change of the molds, and may drastically improve the operation performance of the mold opening/closing apparatus.

The mold opening controller of the present invention has another advantage that the pattern of the mold opening/closing speed may be easily changed and set, whenever necessary.

What is claimed is:

1. A mold opening controller for injection molding machines which comprises a mold opening/closing apparatus including a stationary platen holding a stationary mold, a movable platen holding a movable mold, a mold clamping ram and a mold clamping cylinder for supporting retractably said movable platen, and a hydraulic circuit for driving and moving back and forth said mold clamping ram, wherein the mold opening/closing apparatus provides a control unit controlling the hydraulic circuit, said control unit being further comprised of a setter that sets acceleration/deceleration functions of the movable mold, data input means for inputting mold thickness to the setter, an operational unit for calculating acceleration/deceleration positions of the movable mold and acceleration/deceleration speeds at each moving position at the time of the acceleration/deceleration on the basis of data from said setter and said data input means, a position sensor for detecting the moving position of the movable mold and a control means for controlling the hydraulic circuit so that the acceleration/deceleration positions of the movable mold and its moving speed at each position correspond to output values of the operational unit through the position sensor, and the acceleration/deceleration positions of the movable mold and its moving speed at each position are set automatically to optimum values by inputting the thicknesses of both of the stationary and movable molds and the molding stroke of said movable mold to the data input means.

2. A mold opening controller for injection molding machines according to claim 1, wherein the hydraulic circuit includes a flow rate regulating valve and the control unit for the hydraulic circuit comprises an opening setter associated with said flow rate regulating valve.

3. A mold opening controller for injection molding machines according to claim 1, wherein the hydraulic circuit includes a flow rate regulating valve and a pressure regulating valve, and the control unit for said hydraulic circuit comprises a first opening setter associated with said flow rate regulating valve and a second opening setter associated with said pressure regulating valve.

4. A mold opening controller for injection molding machines according to claim 1, wherein the hydraulic circuit closes the mold with a deceleration that progressively decreases during an end portion of the movement of the movable mold toward the stationary mold.

5. A mold opening controller for injection molding machines according to claim 1, wherein the hydraulic circuit opens the mold with a deceleration that progressively decreases during an end portion of the movement of the movable mold away from the stationary mold.

* * * * *